A. C. Stone.
Horse Rake.
No. 51097. Patented Nov. 21, 1865.
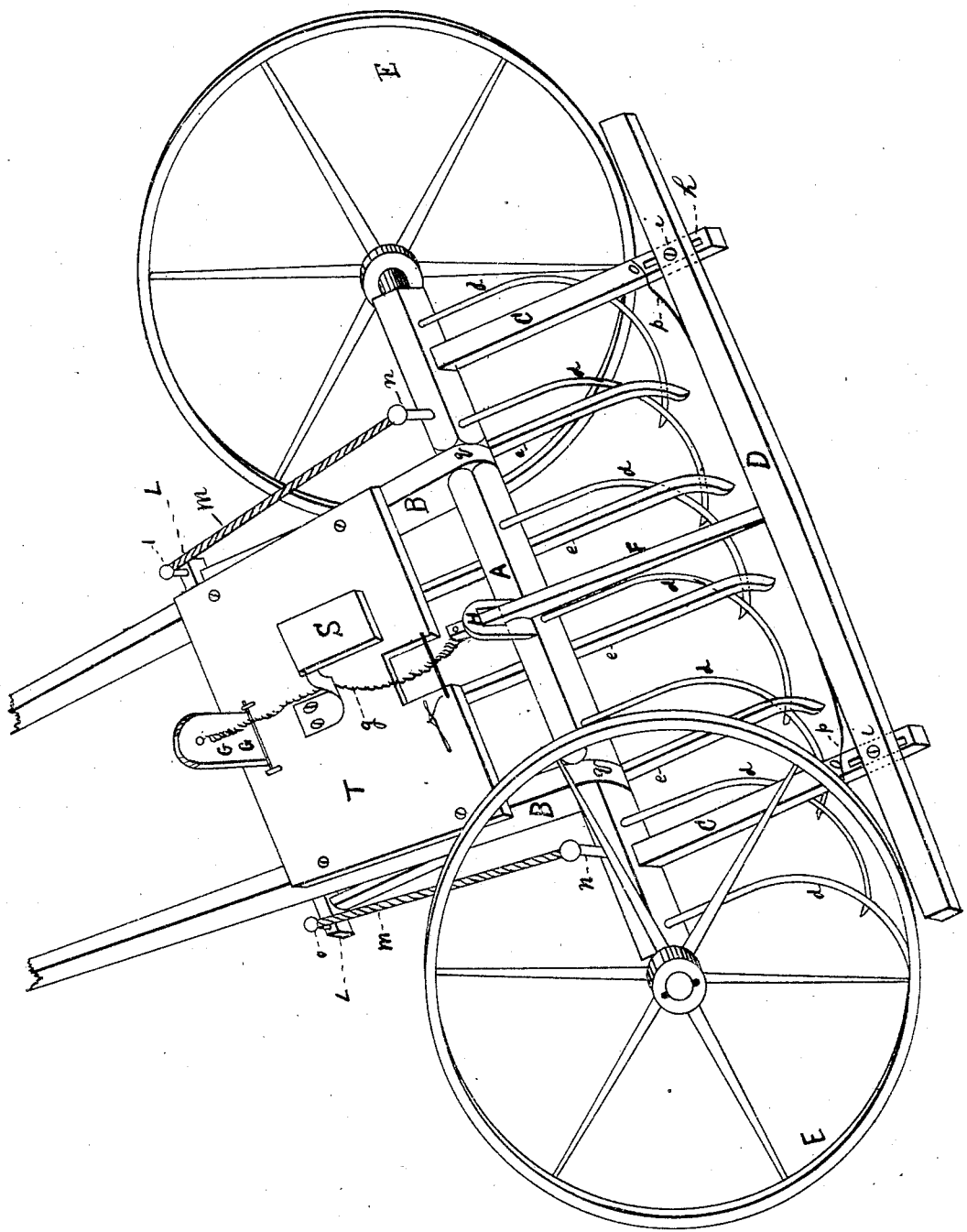
Witnesses.
A. C. B. Orr
J. M. Orr
Inventor.
A. C. Stone

UNITED STATES PATENT OFFICE.

A. C. STONE, OF STEELEVILLE, PENNSYLVANIA.

IMPROVEMENT IN HORSE-RAKES.

Specification forming part of Letters Patent No. 51,097, dated November 21, 1865; antedated November 13, 1865.

*To all whom it may concern:*

Be it known that I, A. C. STONE, of Steeleville, in the county of Lancaster and State of Pennsylvania, have invented a new and useful Improvement in Horse-Rakes; and I hereby declare that the following is a full, clear, and exact description of the construction and operation of the same, reference being had to the accompanying drawings, making a part of this specification.

The nature of my improvement consists in so constructing the clearers of horse-rakes that by a forward movement of said clearers the windrow is drawn out of the bend of the teeth, enabling the teeth to be lifted with less force than would be required under other circumstances.

To enable others skilled in the art to make and use my invention, I will proceed to describe its construction and operation.

Upon a movable axle, A, I place the wheels E E, and to this axle, by means of straps $q\ q$, I attach the shafts B B so that the axle may be permitted to make the necessary turn in discharging. Into the axle I frame two arms, C C, and in their free ends I place two mortises, $h\ h$, in which the bolts $i\ i$ of the brake D work backward and forward, so as to come against the periphery of the wheels when about to raise the teeth. From this brake D, I place a lever, F, the one end of which is framed into the brake D. The other has a notch on its lower surface, which plays through a mortise in the upright H, which is attached to the axle A. The end of the lever F extends some distance beyond the notch. The object of this arrangement is the following: When the lever F is drawn forward the brake D is brought against the periphery of the wheels, and the notch in the ends of the lever drops into the mortise of the upright H, and holds the brake in that position until the forward movement of the wheels carries the brake-lever and axle upward, making about a one-fourth revolution of the axle. The point of the lever now strikes against the rod $f$ on the platform T, and the notch in the lever F is disengaged from the mortise in the upright H. The brake D, being now liberated by the action of the springs $p\ p$ from the periphery of the wheels, drops into its original position. From the forward end of the lever F, I place a rope or chain, $g$, which, passing under the seat S, is attached to a movable foot-board, G, on the platform T. This brings the brake under the control of the driver's foot, as will be seen in a description of the operation of my improvement.

The teeth $d\ d\ d\ d$, &c., I attach to the axle A, so that the revolution of the axle will lift them up and discharge their contents. These teeth I make out of oval steel, giving them their curve, so that their edge shall be presented to the windrow. By this means I get the necessary amount of strength with the least cost of material.

I am aware that flat teeth bent on their edges have been used for rakes; but the objection to this is that such teeth have not sufficient strength laterally. This is obviated by making them oval. I suspend beneath the platform T, on hinges or their equivalent, the clearer L L, the fingers $e\ e\ e\ e$ of which pass between and beyond the curved portion of the teeth. These fingers are bent downward at their points, so that a forward movement of the clearer will bring the bent portion of the fingers against the hay or other material held in the curve of the teeth, forcing it forward, and liberating the teeth. This clearer is moved by means of the eyebolts $n\ n$ on the axle A, the eyebolts $o\ o$ on itself and the rods $m\ m$.

Having thus described the construction of my improved rake, I will now proceed more fully to notice its operation.

The rake being put in motion, and a sufficient quantity of hay or other material being collected by the teeth, the driver, seated on S, passes his foot against the foot-board G. The rope or chain now draws the lever F forward, and brings the ends of the brake D against the wheels, while the notch of the lever drops into the mortise in the upright H, and holds the brake in that position. The brake D is thus carried upward and forward, and through the arms C C revolves the axle A forward, lifting the teeth attached to the axle, and at the same time thrusting forward the clearer L L, the curved portion of the fingers of which press the hay forward out of the curve of the teeth, and hold it until the teeth rise to a sufficient height to pass over the windrow. By the partial revolution of the axle A the notched end of the lever F is now brought in contact with the rod $f$ on the platform T, by means of which the notch on the lever is raised out of the catch in the mortise, and the brake acted on by the springs $p\,p$ is thrown from the periphery of the wheels, and drops to its former position, carrying with it the arms, teeth, &c., ready for another operation.

I am fully aware that revolving axles acted on by a single wheel near its hub have been used in horse-rakes. I am also aware that movable clearers in a downward direction is also an old device. I know, too, that flat teeth have been used in rakes. I therefore wish it to be distinctly understood that I make no claim to any of these devices; but What I do claim as my invention, and wish to secure by Letters Patent, is—

Constructing the clearers of horse-rakes with curved fingers, in combination with giving said fingers a forward movement by the means described, for the purpose specified.

A. C. STONE.

Witnesses:
A. C. B. ORR,
J. M. ORR.